US008266246B1

(12) United States Patent
Cho et al.

(10) Patent No.: US 8,266,246 B1
(45) Date of Patent: Sep. 11, 2012

(54) DISTRIBUTED PLAYBACK SESSION CUSTOMIZATION FILE MANAGEMENT

(75) Inventors: Paul Cho, Seattle, WA (US); Edgardo Nazario, Tempe, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 13/413,260

(22) Filed: Mar. 6, 2012

(51) Int. Cl.
*G06F 15/16* (2006.01)
(52) U.S. Cl. ........ 709/217; 709/218; 709/219; 709/230; 709/231; 709/232; 725/32; 725/33; 725/34; 725/35; 725/36
(58) Field of Classification Search .......... 709/217–219, 709/230–232
See application file for complete search history.

(56) References Cited

U.S. PATENT DOCUMENTS

| | | | |
|---|---|---|---|
| 5,956,716 A | 9/1999 | Kenner et al. | |
| 6,505,169 B1* | 1/2003 | Bhagavath et al. | 705/14.66 |
| 6,700,932 B2 | 3/2004 | Shen et al. | |
| 7,206,854 B2* | 4/2007 | Kauffman et al. | 709/231 |
| 7,668,936 B1 | 2/2010 | Krikorian et al. | |
| 7,761,900 B2* | 7/2010 | Crayford | 725/87 |
| 7,809,802 B2 | 10/2010 | Lerman et al. | |
| 8,010,691 B2* | 8/2011 | Kollmansberger et al. | 709/231 |
| 8,060,407 B1* | 11/2011 | Delker et al. | 705/14.68 |
| 2001/0029538 A1* | 10/2001 | Blockton et al. | 709/226 |
| 2002/0052948 A1* | 5/2002 | Baudu et al. | 709/224 |
| 2002/0067730 A1* | 6/2002 | Hinderks et al. | 370/395.52 |
| 2002/0073084 A1* | 6/2002 | Kauffman et al. | 707/10 |
| 2002/0111847 A1* | 8/2002 | Smith, II | 705/10 |
| 2002/0147985 A1* | 10/2002 | Miyajima et al. | 725/109 |
| 2004/0267652 A1* | 12/2004 | Kindo et al. | 705/37 |
| 2005/0010639 A1* | 1/2005 | Long et al. | 709/204 |
| 2005/0039206 A1* | 2/2005 | Opdycke | 725/35 |
| 2007/0083886 A1* | 4/2007 | Kauffman et al. | 725/34 |
| 2007/0094082 A1* | 4/2007 | Yruski et al. | 705/14 |
| 2008/0034393 A1* | 2/2008 | Crayford | 725/87 |
| 2008/0189735 A1* | 8/2008 | Barton et al. | 725/32 |
| 2008/0201736 A1* | 8/2008 | Gordon et al. | 725/34 |
| 2008/0270223 A1* | 10/2008 | Collins et al. | 705/10 |
| 2009/0006192 A1* | 1/2009 | Martinez et al. | 705/14 |
| 2009/0019176 A1 | 1/2009 | Debrosse | |
| 2009/0024927 A1* | 1/2009 | Schrock et al. | 715/722 |
| 2009/0182888 A1* | 7/2009 | Westerink et al. | 709/231 |
| 2009/0208184 A1* | 8/2009 | Takahashi | 386/68 |

(Continued)

OTHER PUBLICATIONS

IBM, "IBM Digital Media Solutions for the media and entertainment industries", Retrieved on May 3, 2012 from http://www-01.ibm.com/software/genservers/commerce/pdf/DMforEntertainment.pdf, 2003, p. 1-4.

(Continued)

*Primary Examiner* — Backhean Tiv
(74) *Attorney, Agent, or Firm* — Kilpatrick Townsend & Stockton LLP

(57) ABSTRACT

A method, device and/or system for syndicating customization files, which define playback experience for content rendered on media players. The customization files are referenced by links distributed to the media players. Each customization file references a plurality of content objects that are stitched together to create the playback experience. A delivery network is used to distribute the customization files to the media players. Updates to the customization files can be done after distribution of their corresponding links. Usage information for the customization files are reported from the media players.

18 Claims, 5 Drawing Sheets

U.S. PATENT DOCUMENTS

| | | | |
|---|---|---|---|
| 2009/0265220 A1* | 10/2009 | Bayraktar et al. | 705/10 |
| 2009/0324006 A1* | 12/2009 | Lu et al. | 382/100 |
| 2010/0125872 A1* | 5/2010 | Crow et al. | 725/35 |
| 2010/0131333 A1* | 5/2010 | Ball et al. | 705/10 |
| 2010/0142914 A1* | 6/2010 | Zhao | 386/52 |
| 2010/0153943 A1* | 6/2010 | Chase | 717/173 |
| 2010/0253847 A1* | 10/2010 | Krause et al. | 348/584 |
| 2011/0161409 A1* | 6/2011 | Nair et al. | 709/203 |
| 2011/0184807 A1* | 7/2011 | Wang et al. | 705/14.53 |
| 2011/0191178 A1* | 8/2011 | Newberg et al. | 705/14.53 |
| 2012/0028688 A1* | 2/2012 | Vartanian | 455/566 |

OTHER PUBLICATIONS

Grant Goodman, "Syndication Strategies", Retrieved on May 3, 2012 from http://support.brightcove.com/en/docs/syndication-strategies, 2009, p. 1-4.

* cited by examiner

DISTRIBUTED PLAYBACK SESSION CUSTOMIZATION FILE MANAGEMENT

BACKGROUND

This disclosure relates in general to video playback over the Internet and, but not by way of limitation, to distribution of customization files that customize playback sessions.

Embedded video players are placed into web pages to allow playback of video without leaving the browser environment. Scripting and run-time languages such as Flash™ and HTML5 are used to seamlessly integrate video playback applets into browsers or media player applications. The embedded video players can be modified with a customization file to produce a video experience for the end user. The customization file can be text or binary and includes information for locating a number of video segments that are used to produce a playback experience. Player applications or applets running on streaming devices, televisions, set top boxes, disc players, tablets, computers, etc. can also use a customization file to create the playback experience.

Video players can play a video comprised typically as a number of segments or even smaller chunks with optional ads inserted into the playback experience. Playlist video players retrieve video files specified in a customization file and sequentially play them so as to give the viewer a seamless playback experience. The video files can be stored on an origin server, ad servers, hosted by a third party, or cached on a content delivery network (CDN). The customization files are modified by designers or content distributors who might change ads inserted, bitrates, aspect ratio, overlay information, program information, etc., for example. For popular playback experiences, hosting the customization files requires a large number of servers to allow the video players to quickly and efficiently retrieve the customization files.

SUMMARY

In one embodiment, the present disclosure provides a method for syndicating customization files, which define playback experience for content rendered on media players. The customization files are referenced by links distributed to the media players. Each customization file references a number of content objects that are stitched together to create the playback experience. A delivery network is used to distribute the customization files to the media players. Updates to the customization files can be done after distribution of their corresponding links. Usage information for the customization files are reported from the media players.

In another embodiment, a method for syndicating customization files, which define playback experience for content rendered on a media player, is disclosed. A link to a customization file is produced, where the link is resolvable across the Internet to the customization file. Information originating from a designer of the playback experience is received, where the information is received after the link is produced and distributed. The customization file is modified according to the information, where the customization file defines a number of content files for stitching together at the media player to create the playback experience. The customization file is sent to a delivery network, where the delivery network has a geographically-distributed number of POPs that each are capable of delivering the customization file upon the customization file being requested with the link by the media player.

In yet another embodiment, a media syndication engine for processing customization files, which define playback experience for content rendered on a media player, is disclosed. The media syndication engine includes a number of customization files, a distribution network interface and a designer interface. The number of customization files each resolvable with a link from across the Internet. The number of customization files includes a customization file. The customization file defines a number of content files for stitching together at the media player to create the playback experience. The customization file is sent to a delivery network with the distribution network interface. The delivery network has a geographically-distributed number of POPs that each are capable of delivering the customization file upon the customization file being requested with the link by the media player. The designer interface receives information originating from a designer of the playback experience. The information is received after the link is produced and distributed. The customization file is modified according to the information.

A method for syndicating customization files, which define playback experience for content rendered on a media player, is disclosed. A link to a customization file is produced. The link is resolvable across the Internet to the customization file. The link is configured for embedding in a third-party web accessible location. Information originating from a designer of the playback experience is received, where the information is received after the link is produced and distributed. The customization file is modified according to the information, where the customization file defines a number of content files for stitching together at the media player to create the playback experience. Usage information is received from a number of media players for a number of customization files, where the number of customization files includes the customization file. A POP subset of the number of POPs is determined as a function of the usage information. The customization file is sent to a delivery network. The delivery network has a geographically-distributed number of points of presence (POPs) that each are capable of delivering the customization file upon the customization file being requested with the link by the media player. The sending the customization file loads the customization file on the POP subset to exclude some of the number of POPs unless subsequently requested at the excluded some. It is indicated to the delivery network a time-to-live after which requests for the customization file should be fulfilled by requesting the customization file from an origin server. Periodically determining a customization file subset of the number of customization files, which have changed since the number of customization files have previously been send to the number of POPs. The customization file subset is sent to at least the POP subset.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

DETAILED DESCRIPTION

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1A:
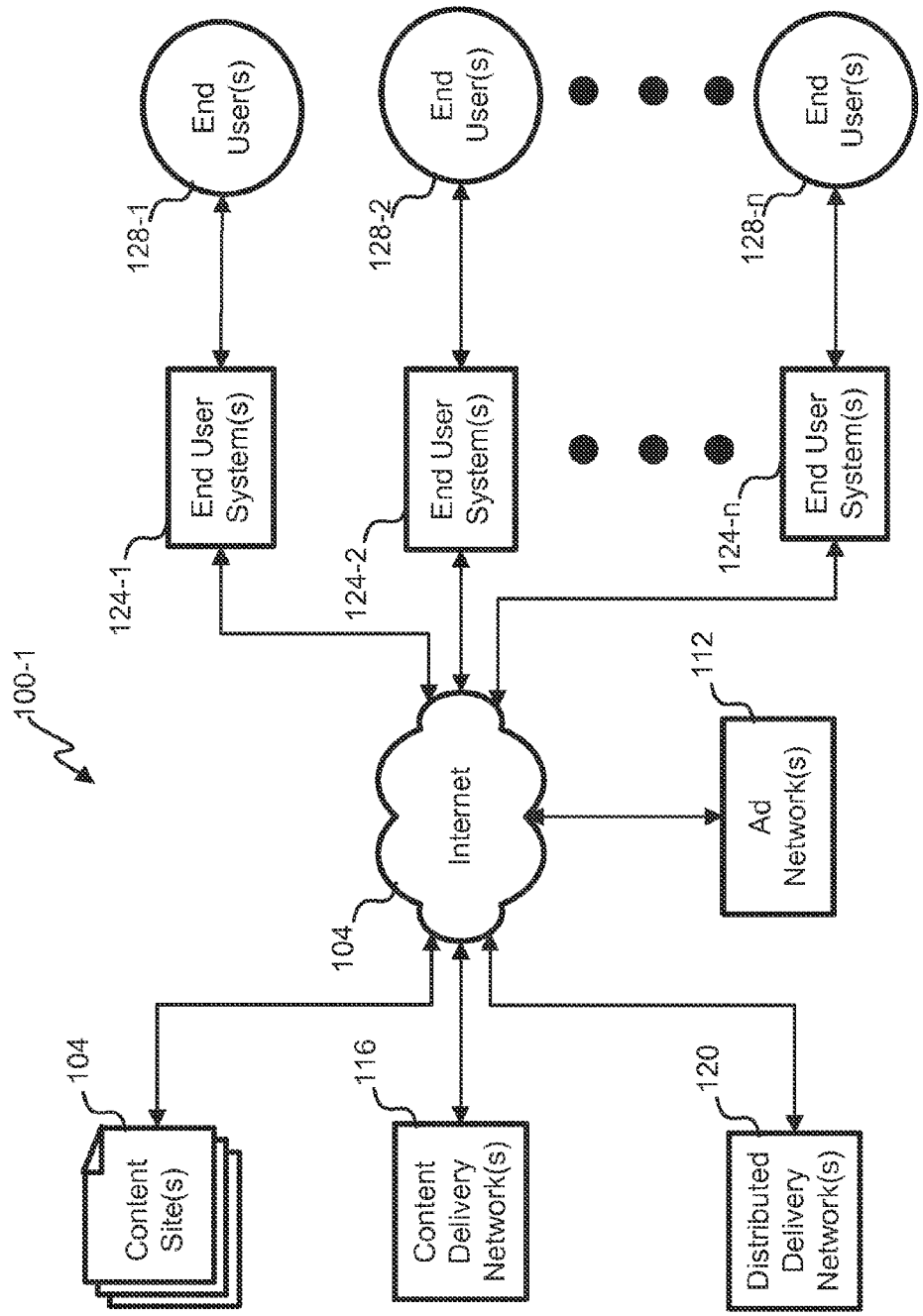
FIGS. 1A and 1B depict block diagrams of embodiments of a content delivery system operating over the Internet.

With reference initially to FIG. 1A, a block diagram of an embodiment of a content delivery system 100-1 operating over the Internet 104 is shown. End users 128 interact with their end user systems 124, which could be a personal computer, wireless phone, tablet computer, web pad, kiosk, an electronic pad, an IPTV player, a portable music player, a set top box, or other computing device. Any software that renders video and/or audio could run on the end user system 124, for example, a web browser, a Flash™-based player, an application, an applet, etc.

In this embodiment, the video and/or audio software is up playlist-player which is to say that it receives a number of different content files and stiches, splices or otherwise plays them sequentially to the end user in a seamless experience. The end user system 124 navigates to a content site 104 with a web browser, player application or mobile phone application under the direction of the end user 128. The content site 104 invokes an embedded player applet. The embedded player applet has a link to a customization file that modifies the operation of the embedded player applet and/or the video/audio playback experience. The end user system 124 requests the link to gather a customization file from a distributed delivery network (DDN) 120, but it could be an origin server, the content site 104 or elsewhere through the Internet 104.

The customization file includes variables that specify various options for the embed code that customizes the playback experience according to the various options specifies by a designer for the content site. The customization file also specifies content files or streams to play in succession. The content files could be chunks defined by a streaming protocol or could be segments between commercial breaks and the commercials. The different chunks or segments can be stored as files in the same or different locations as specified by the customization file. In some cases, the content file is defined to have avails that later can have commercials inserted therein, either before or after playback has begun. The content files or streams could have addresses specifying delivery from a content delivery network (CDN) 116, the content site 104, an origin server, or the DDN 120.

Advertisements for splicing into playback experience are gathered from an ad network 112 or specified by the ad network 112 and delivered from another location. The ad network 112 allows ad campaigns to be placed dynamically by placing a reference to the ad network 112 in the customization file. The end user system 124 will query the ad network 112 for a piece of content to be included in the playback experience. Information relating to the end user 128 or other information may be included in the request to allow the ad network 112 to select appropriate advertising after the customization file has been downloaded to the end user system 124.

Figure 1B:
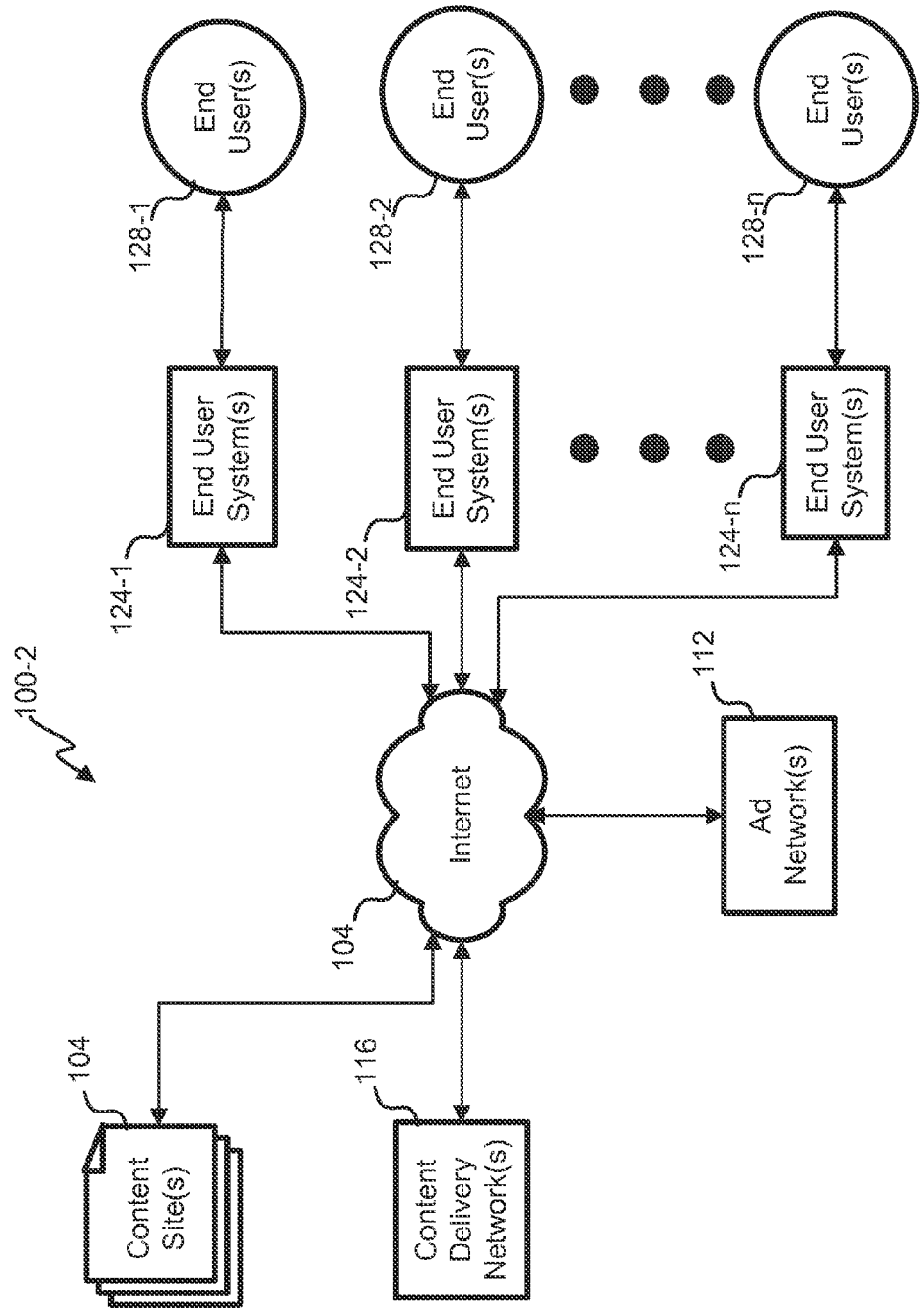

With reference to FIG. 1B, a block diagram of another embodiment of a content delivery system 100-2 operating over the Internet 104 is shown. This embodiment does not store the customization file on the DDN, but instead stores the customization file on the CDN 116 along with, optionally, the content files and, perhaps even, ad content. Other embodiments could store the characterization file anywhere that is accessible from the Internet 104. The customization file can be changed periodically even after the web page and the link to the customization file is formulated and placed on a web page, for example. Changes to the customization file can be propagated quickly using the CDN 116 in this embodiment or the DDN 120 or a cloud storage solution in other embodiments.

Figure 2:
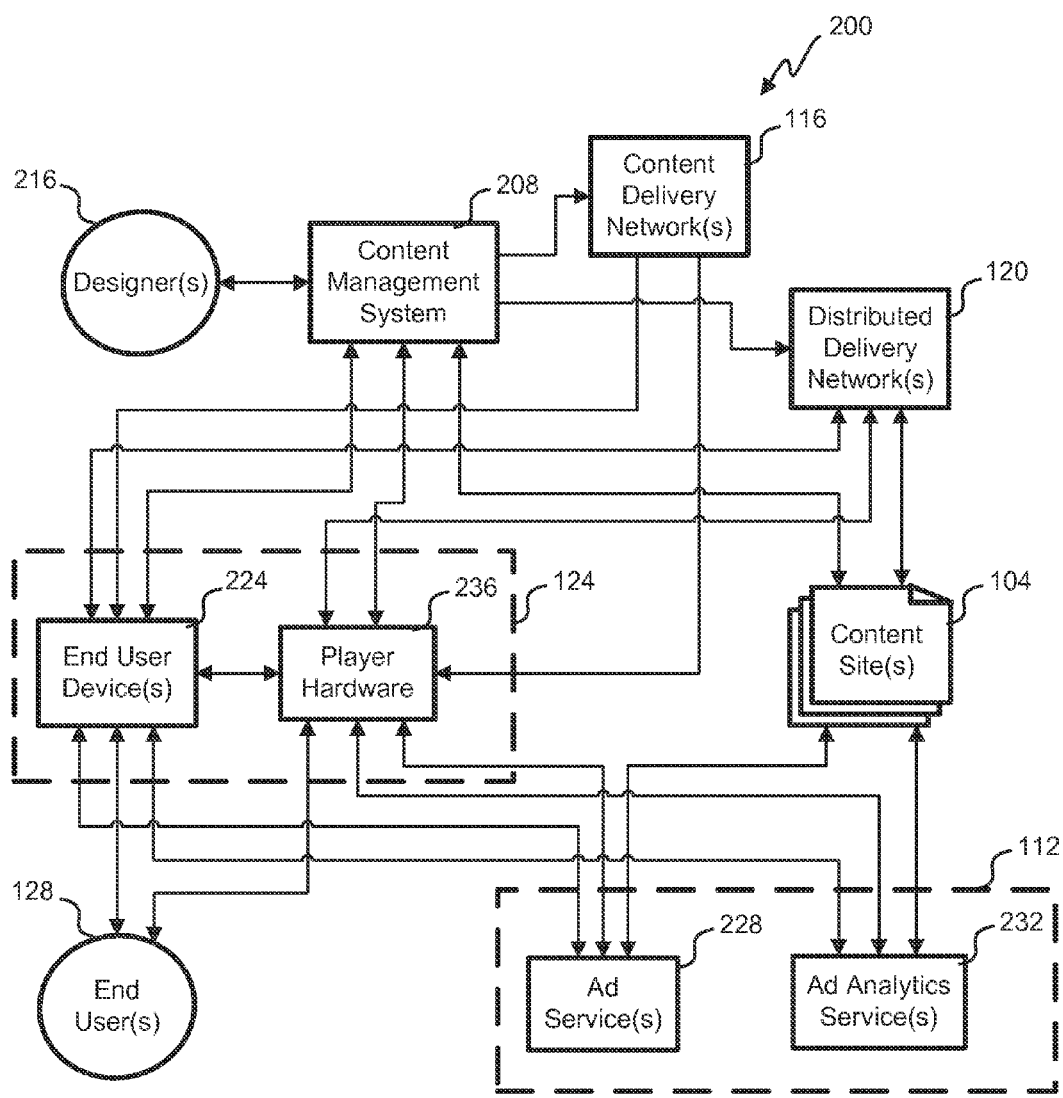
FIG. 2 depicts a block diagram of an embodiment of a content distribution system.

Reaming next to FIG. 2, a block diagram of an embodiment of a content distribution system 200 is shown. Designers 216 interact with a content management system (CMS) 208 to syndicate content for end users 128 to enjoy on their end user devices 224 or other player hardware 236. Content sites 104 include web sites or other interfaces that are accessed by the end user devices 224 using a web browser, content player or other application software running on end user systems 124. A content object is any content file or live content stream and could include, for example, slideshow, animation, video, and/or audio. The content object could be live, delayed and/or stored. Throughout the specification, references may be made to a content object, content, content stream and/or content file, but it is to be understood that those terms could be used interchangeably wherever they may appear.

The content sites 104 could be set up by the designer 216, end users 128 or others involved in distributing content. When the designer 216 originally syndicates content, a content site 104 is typically chosen for embedding code that plays the content object, but there is an option to take embed code from that first content site 104 for placement in another content site 104 by an end user 128. The embed code renders itself or causes the content object to be rendered on any number of end user devices 224 with video player code that is referenced in the embed code. The video player code partially loads when the end user 128 request that web page on the content site 104. After selection of a content object, the customization file is retrieved from the DDN 120 to specify the loading additional modules associated with the content object. The customization file can also specify the look of the video player, the various options and/or operation such that the video player code is usable for a wide variety of purposes. For example, the customization file could specify a orange and blue color scheme for playback of wide-format videos along with modules that allow social networking features and a list of related content available during playback of the primary content object. In one embodiment, later specification of player behavior in the customization file avoids downloading unnecessary code and allows customization of the presentation for the end user experience.

This embodiment optionally uses a content delivery network (CDN) 116 to deliver content objects, embed code, video player code, module code, web pages, etc. as an alternative or supplement to the CMS 208 can hosting. Designers 216 can syndicate storing their content anywhere, but would often use a CDN 116 or DDN 120 for popular content. In some cases, some content is served from the CDN 116, other content is hosted and/or cached on the content site 104, the CMS 208, and/or the DDN 120. As embed code is moved from site to site, hosting of content and code can remain the same or move in whole or in part. The original designer 216 originally syndicating the embed code has less control of how the embed code moves around to various content sites 104.

According to the preferences specified by the designer 216, a customization file is created for each content object. The customization file stored in the CMS 208 who may serve as the origin server, or it may be hosted and/or cached by the content site 104, the CDN 116, and/or the DDN 120 in various embodiments or at the option of the designer 216. Use of a DDN 120 or CDN 116 can provide higher QoS especially for very popular content objects that will have frequent requests for the corresponding customization file.

The embed code loads video player code that has the ability to playback the content object within the web browser running on the end user device 224 or player hardware 236 of the end user 128. The video player code with any additional modules loaded interfaces with other services to aid in serving commercials and providing analytics for those ads from the ad network 112. In this embodiment, the ad network 112 includes an ad service 228 and an analytics service although analytics could be gathered by the CMS 208, CDN 116, DDN 120, the content site 104, or other parties in other embodiments. In some embodiments, the video and/or audio rendering function gathers the analytics and reports it to the appropriate party. In other embodiments, other analytics information could be gathered by the video rendering function and reported to the various parties mentioned above with regard to the ad analytics.

One or more ad services 228 are supported to allow the ad modules of the video player provide contextual information used by the ad service 228 in providing an ad that is stitched into the playback experience according to the customization file. Any number of different ad services 228 can be specified in the customization file for any number of avails in the content object. One or more analytics services 232 interface with analytics modules of the video player to record usage information related to the rendering of the content object for the end user 128 in this embodiment. Other embodiments can use ad serving functionality supported by the CMS 208 or CDN 116 as an alternative or in addition to the ad service(s) 228 and analytic service(s) 232.

Figure 3:
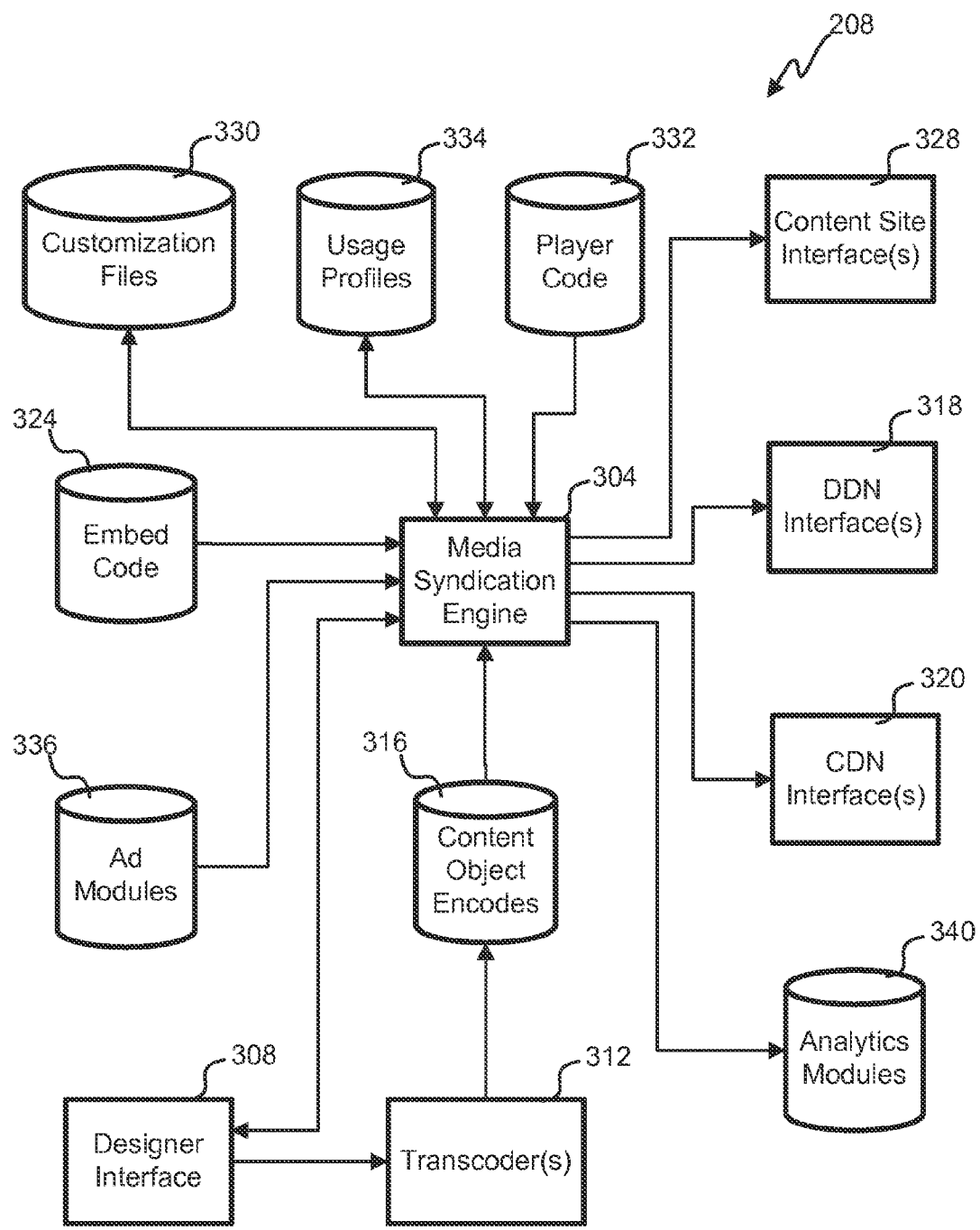
FIG. 3 depicts a block diagram of an embodiment of a content management system.

With reference to FIG. 3, a block diagram of an embodiment of the CMS 208 is shown. To syndicate content, the designer 216 interacts with a designer interface 308. The content object is operated upon by a transcoder(s) 312 to be processed into one or more encodings, formats, bitrates, protocols, chunks, segments, etc. to support all the various end user devices 224 that might render the content object and to create avails for inserting of ads. In this embodiment, the content object is transcoded into eight different encodes or other representations, but other embodiments could have more or less encodes at the selection of the designer 216. The transcoded versions are stored as content object encodes 316.

The designer 216 further interacts with the designer interface 308 to edit the content objects, insert advertising capability, specify the analytics to measure, specify where the content object should be syndicated, how the content playback applet embeds in a web page, where the content objects are hosted, etc. The designer 216 can edit the content object prior to transcoding with the CMS 208. Advertising can have their location or avails specified for insertion or can be manually spliced into the content object or later during playback in the web browser on the end user device 224 or other player hardware 236. There are several versions of the Flash,™ HTML5 with JavaScript™ or Silverlight™ player that are stored as player code 332. The video players built into browsers and phones are also supported. The designer can define the look and functionality for the player from predefined and/or customized templates that are specified in customization files 330.

Customization files 330 are specified by the designer to affect how the embed code will customize the video player code to operate on a particular end user device 224. The embed code 324 may check to see if certain fallback content objects are enabled in the customization file 330 to effectively customize operation of the embed code 324 for different domains, clients, zones, sub-directories, content types, end user devices, etc. For example, the designer may not want to pay for mobile format encodings, or they may have disabled them because they don't want users to get access to content that cannot be protected by digital rights management (DRM). The embed code 324 refers back to the customization file 330 upon execution to customize how the embed code 324 operates. This allows modification of the operation of the embed code 324 after placement on a web site without having to update or change the embed code or link to the customization file 330.

Security for the embed code 324 can be configured by changing the customization file 330 at any time including after the embed code 324 and or link to the customization file 330 is placed into a web page. The embed code 324 has programming to allow operation at varying levels of security. The security may be managed on the end user device 224, by the content management system 208 or a combination thereof as dictated by the customization files 330. The embed code 324 could query to the customization file 330 to determine what security features to perform on the end user device 224 and which are performed by the content management system 208. In some cases, the embed code 324 and/or the content management system 208 will prevent certain actions from being performed on a case-by-case basis. For example, the end user device 224 could be a particular model of phone without required functionality, have out of date DRM, have invalid security certificates, have malfunctioning or obsolete hardware that would cause certain content objects to be unplayable as choreographed by the embed code 324 and the customization file 330.

The analytic module 340 loaded by the embed code 324 can report back to the CMS 208 how the content object and customization file 330 is being used. For example, the portions of the content object normal-played or trick-played through can be reported along with the ads played or skipped can be reported and stored as usage profiles 334. Information about the player instance, end user system 124, end user device 224 and/or player hardware 236 can be reported along with the iP address or location of playback. In some cases, demographic and/or cookied information can be gathered and reported back for the usage profile 334.

Portions of the usage file can be used when prepopulating or hosting the customization file on the DDN 120 or CDN 116. The time-to-live can be increased for customization files that change infrequently, for example. The usage of a customization file from the various regions of the Internet or POPs can be stored in the usage profile such that prepopulation only occurs for customization files that reach a threshold amount of requests from a particular POP or edge server. Whether to host or cache the customization file 330 for a particular piece of content can also be chosen based upon how likely a particular POP will receive requests, for example, for customization files that are normally cached anyway, hosting can be selected.

Embed code 324 is JavaScript™ or another scripting language that executes in a web browser or player on the end user device 224. The embed code 324 is placed in a web page of the content site 104 by the designer themselves or automatically using the media syndication engine 304. The embed code 324 autonomously determines the desired way to play a content object in a web browser or player application. Different end user devices 224 dictate the need for embed code that can react accordingly to provide consistent playback experience regardless of the platform. Other embodiments could have server-side logic to determine the best way to play the content object. The server-side logic can support a wider variety of end user devices 224, for example, to support devices without JavaScript™ and/or Flash.™

At the option of the designer, the media syndication engine 304 can automatically syndicate the content. The media syndication engine 304 controls a content site interface 328, a DDN interface 318 and/or a CDN interface 320. The content site interface 328 can automatically insert the embed code and/or content object, for example, onto social networking sites, blog sites, video sharing sites, etc. The CDN interface 320 is used to place content objects onto one or more CDNs 116 that might host and/or cache the content objects. The CDN interface 320 can supply content objects through pre-population of the CDN 116 or when the CDN 116 experiences a cache miss. The DDN interface 318 passes the customization files 330 for hosting and/or cacheing by one or more DDNs 120 and can also use pre-population where supported by the DDN 120. Usage profiles 334 for the content objects and customization files 330 is used when deciding where distribute storage, to host or cache or vary the time-to-live in the cache. Both pushing updates to content files and customization files on the CDN 116 and/or DDN 120 is supported along with pulling updates from cache misses on the CDN 116 and DDN 120.

Editing and ad insertion are also optionally performed by the media syndication engine 304. The designer can edit videos and metadata (e.g., title, description, tags) and stitch, cut and otherwise edit video, sound and images or designate avails for later insertion of ads at the playback time. Ad insertion can be done by splicing or overlaying ads directly into the content before delivery or controlled by player logic at run-time to switch-out or overlay the content with an in-place ad, postplate or banners at the end user device 224. Some embodiments will automatically find ad insertion points using white space detection algorithms, for example.

The CMS 208 provides modules on demand to the player code 332 once loaded after rendering of a web page in a browser or after the player hardware 236 or application is loaded in other embodiments. The player code 332 has certain functionality to render the content and provide a base-level functionality. On a content object-by-content object basis, additional modules 336, 340 can be loaded to customize the player or content (i.e., the playback experience). Each content object can specify the modules used to enhance the functionality of the player code 332. For example, a number of analytics modules 340 support any number of different analytics function and analytics services 232.

Ad modules 336 are developed to support any number of ad types and any number of ad services 228. Ad services 228 can be hosted within the CDN 320 or CMS 208 in some embodiments, but would also include third-party ad services 228. The ad services 228 each have different interfaces that specify different information in a different sequence. There are ad modules 336 to support the different ad services 228. There can be different ad modules 336 to support different offerings of a particular ad service 228. For example, DoubleClick™ is a third-party ad service 228. There is a particular protocol for interfacing with DoubleClick™ (i.e., DART) and an ad module 336 is designed to support that particular interface and protocol.

Figure 4:
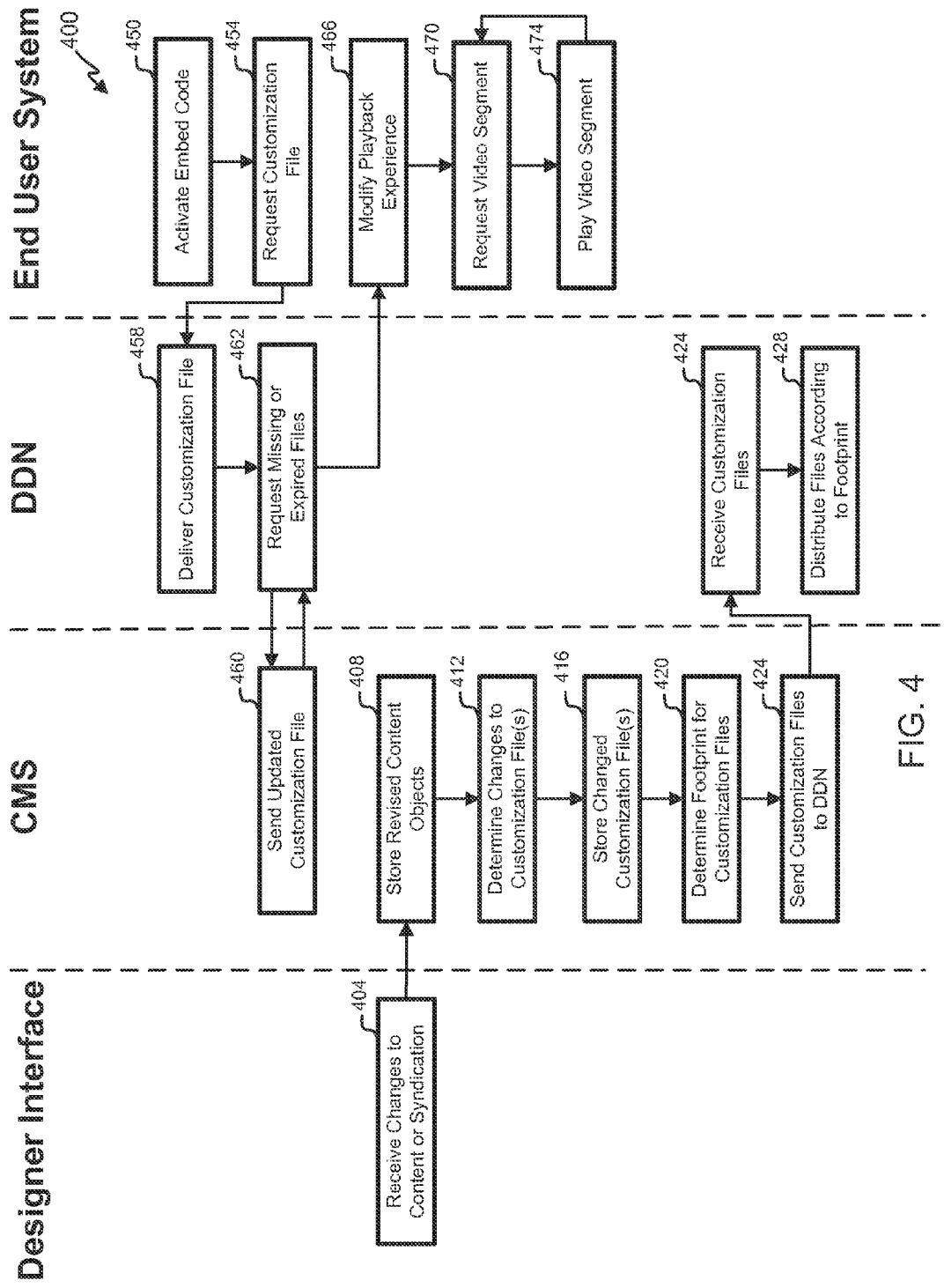
FIG. 4 depicts a swim diagram of embodiment of syndication and content delivery processes.

With reference to FIG. 4, a swim diagram of an embodiment of syndication and content delivery processes are shown. The depicted portion of the syndication process is begins at block 404 where the designer 212 interacts with the designer interface 308 to make changes to the content and/or playback experience. The corresponding customization file 330 is affected by these changes as could the content object itself. The editing could be done on the CMS 208 or simply uploaded to an application program interface (API) of the designer interface 308. For example, a content provider may revise an overlay over certain portions of programs and upload new content objects in bulk or they may redo which modules are included during playback. Customization files 330 would be reworked in the latter example, but only the content files would be reworked in the former.

Any revisions to the content objects are stored in block 408. Some or all segments of the content objects may be transcoded to prepare them for syndication. Changes to the corresponding customization files 330 are determined in block 412, for example, the file names and locations for the segments may change. Those changes are stored in block 416. In block 420, the footprint for distributing the changes to the customization files 330 is determined. The media syndication engine 304 first looks at the prior usage footprint and volume if there is any. Should there be no history or little information, a usage footprint and volume is assumed from any groups that the customization file might belong to. For example, a new customization file for a nationally-televised football game would have no history when that content object is first syndicated so usage for similar nationally-televised football games would be used. In addition to determining the footprint for prepopulation and/or hosting, the delivery volume and frequency of change information is used to specify a time-to-live. A default time to live of 90 seconds is used in one embodiment.

In block 424, the changed customization files 330 are sent to the DDN 120. The updated customization files 330 could be sent when the changes are completed or according to some periodic schedule. For example, a process could upload new or changed customization files 330 every minute to the DDN 120. The customization files are received by the DDN 120 in block 424. Specifics on the footprint of edge servers and POPs to use is specified optionally the hosting or cacheing request along with a time-to-live. The DDN 120 populates caches and data stores according to the request in block 428. When customization files go beyond their time-to-live without replacement with a newer version, the DDN 120 will make a request for the customization file back to the CMS 208 or any other location specified as the origin server. Although not shown, the content objects are distributed in a similar manner taking into account usage, frequency, footprint, etc. to formulate a footprint and time-to-live for cacheing and/or hosting.

The depicted portion of the content delivery process begins in block 450 where the end user system 124 activates some embed code 324 present on the content site 104, for example. A link is provided at the content site 104 or other location remote from the end user system 124. In block 454, the customization file is requested and through a process of the DDN 120 a POP would be selected from a number of POPs according to some algorithm. In this embodiment, the customization file 330 is hosted or prepopulated in a cache of the DDN 120. If the customization file 330 were missing or past the time-to-live, a process for finding it in parent caches or the origin server would be used as shown in block 462. The updated customization file 330 is sent from the CMS 208 to the DDN 120 in block 460. The DDN 120 would cache the customization file 330.

In block 466, the end user system 124 modifies the player according to the preferences and modules specified in the customization file 330. The customization file also specifies links to a number of segments and/or ads and/or avails that are requested in succession by the end user system 124. Each segment is played in succession while more segments are requested in block 474. The request and playback happens a number of times in a loop until the complete content object is played. Some of the links in the customization file 330 could be to an ad server that decides on the fly which ads to serve rather than having the ads specifically defined in the customization file 330.

A number of variations and modifications of the disclosed embodiments can also be used. For example, the above embodiments discuss using usage information to modify how the customization files and content objects are distributed and syndicated through the CDNs and DDNs. Other embodiments could allow usage information for different content affect a customization file in some way. For example, usage for a customization file for a particular game of a town's football team could be used when the next game is syndicated under the presumption that usage will be similar. A domain, web site, web page, subdomain, or other grouping could be used to imply usage to a new customization file in the same grouping. For example, a grouping with content spoken in a particular language will have a usage patterns that correspond to understanding that language and new content can receive a usage profile that is similar. Upon gathering actual usage information, the distribution profile for the customization file can change over time. Recent data can be favored over older data on usage as the recent preferences of end users is likely to be a better predictor of usage in the immediate future.

Above embodiments control ad modules at the granularity of content object. Ad functionality could be added to groups of content objects, for example, by playlist, customer, playback resolution, subject matter, site where embed code was loaded from, etc. in other embodiments. We disclose above the use of modules that are loaded after the video is selected with an embedded player. Beyond ads and analytics, other functionality can be added with modules as dictated by the customization file, which can change over time to support new functionality even if the embed code and the link to the customization file is already disseminated. Specifically, there could be modules that implement closed captioning, video editing and clipping, different decoding, linking from the video to other web sites, etc.

Specific details are given in the above description to provide a thorough understanding of the embodiments. However, it is understood that the embodiments may be practiced without these specific details. For example, circuits may be shown in block diagrams in order not to obscure the embodiments in unnecessary detail in other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for syndicating customization files, which define playback experience for content rendered on a media player, comprising:
producing a link to a customization file, wherein
the link is resolvable across the Internet to the customization file, and
the link is configured for embedding in a third-party web accessible location;
receiving information originating from a designer of the playback experience, wherein the information is received after the link is produced and distributed;

modifying the customization file according to the information, wherein the customization file defines a plurality of content files for stitching together at the media player to create the playback experience;
receiving usage information from a plurality of media players for a plurality of customization files, wherein the plurality of customization files includes the customization file;
determining a point of presence (POP) subset of a geographically-distributed plurality of POPs as a function of the usage information;
sending the customization file to a delivery network, wherein:
the delivery network has the geographically-distributed plurality of POPs that each are capable of delivering the customization file upon the customization file being requested with the link by the media player, and
the sending the customization file loads the customization file on the POP subset to exclude some of the plurality of POPs unless subsequently requested at the excluded some of the plurality of POPs;
indicating to the delivery network a time-to-live after which requests for the customization file should be fulfilled by requesting the customization file from an origin server;
periodically determining a customization file subset of the plurality of customization files, which have changed since the plurality of customization files have previously been send to the plurality of POPs; and
sending the customization file subset to at least the POP subset.

2. A method for syndicating customization files, which define playback experience for content rendered on a media player, comprising:
producing a link to a customization file, wherein the link is resolvable across the Internet to the customization file;
receiving information originating from a designer of the playback experience, wherein the information is received after the link is produced and distributed;
modifying the customization file according to the information, wherein the customization file defines a plurality of content files for stitching together at the media player to create the playback experience;
receiving usage information from a plurality of media players;
determining, based on the usage information, a subset of geographically-distributed plurality of POPs that each are capable of delivering the customization file upon the customization file being requested with the link by the media player;
sending the customization file to a delivery network, wherein the delivery network has the geographically-distributed plurality of POPs,
wherein the sending the customization file loads the customization file on the subset of POPs to exclude some of the plurality of POPs unless subsequently requested.

3. The method for syndicating customization files, which define playback experience for content rendered on the media player as recited in claim 2, further comprising determining a subset of the plurality of POPs, wherein the sending the customization file loads the customization file on the subset to exclude some of the plurality of POPs unless subsequently requested.

4. The method for syndicating customization files, which define playback experience for content rendered on the media player as recited in claim 2, further comprising indicating to the delivery network a time-to-live after which requests for the customization file should be fulfilled by requesting the customization file from an origin server.

5. The method for syndicating customization files, which define playback experience for content rendered on the media player as recited in claim 2, further comprising determining a subset of the plurality of POPs, wherein:
the sending the customization file loads the customization file on the subset to exclude some of the plurality of POPs unless subsequently requested, and
the subset is determined based upon prior requests for the customization file.

6. The method for syndicating customization files, which define playback experience for content rendered on the media player as recited in claim 2, further comprising distributing the link for embedding in a third-party web site.

7. The method for syndicating customization files, which define playback experience for content rendered on the media player as recited in claim 2, further comprising:
determining usage for content similar to the content of the customization file, and
specifying to a footprint for cacheing, prepopulation or hosting to the delivery network according to usage for the similar content.

8. The method for syndicating customization files, which define playback experience for content rendered on the media player as recited in claim 2, further comprising:
periodically determining a subset of a plurality of customization files have changed since the plurality of customization files have previously been send to the plurality of POPs; and
sending the subset to the plurality of POPs.

9. A non-transitory machine-readable medium having machine-executable instructions configured to perform the machine-implementable method for syndicating customization files of claim 2.

10. A machine adapted to perform the machine-implementable method for syndicating customization files of claim 2.

11. A media syndication engine for processing customization files, which define playback experience for content rendered on a media player, the media syndication engine comprising:
a plurality of customization files each resolvable with a link from across the Internet, wherein:
the plurality of customization files includes a customization file, and
the customization file defines a plurality of content files for stitching together at the media player to create the playback experience;
a distribution network interface, wherein:
the customization file is sent to a delivery network with the distribution network interface,
the delivery network has a geographically-distributed plurality of POPs that each are capable of delivering the customization file upon the customization file being requested with the link by the media player, and
the sending the customization file loads the customization file on a determined subset of the plurality of POPs to exclude some of the plurality of POPs unless subsequently requested, the subset of POPs being determined based upon prior requests for the customization file; and
a designer interface for receiving information originating from a designer of the playback experience, wherein:

the information is received after the link is produced and distributed, and the customization file is modified according to the information.

12. The media syndication engine for processing customization files, which define playback experience for content rendered on the media player as recited in claim 11, wherein:
   a subset of the plurality of POPs are determined, and
   the sending the customization file loads the customization file on the subset to exclude some of the plurality of POPs unless subsequently requested.

13. The media syndication engine for processing customization files, which define playback experience for content rendered on the media player as recited in claim 11, further comprising a content delivery network (CDN) interface wherein the content object is syndicated through the CDN interface.

14. The media syndication engine for processing customization files, which define playback experience for content rendered on the media player as recited in claim 11, wherein the delivery network is sent a time-to-live for the customization file after which requests for the customization file should be fulfilled by requesting the customization file from an origin server.

15. The media syndication engine for processing customization files, which define playback experience for content rendered on the media player as recited in claim 11, further comprising a usage profile for the customization file that records usage of the customization file collected from a plurality of media players.

16. The media syndication engine for processing customization files, which define playback experience for content rendered on the media player as recited in claim 11, wherein:
   usage information is received from a plurality of media players,
   a subset of the plurality of POPs is determined,
   the media syndication engine causes the customization file to be loaded on the subset to exclude some of the plurality of POPs unless subsequently requested, and
   the subset is determined based the usage information.

17. The media syndication engine for processing customization files, which define playback experience for content rendered on the media player as recited in claim 11, wherein:
   a subset of a plurality of customization files is determined to have been changed since the plurality of customization files have previously been send to the distribution network; and
   the subset is sent to the distribution network.

18. The media syndication engine for processing customization files, which define playback experience for content rendered on the media player as recited in claim 11, wherein:
   the distribution network interface passes a time-to-live for the customization file, and
   the time-to-live is varied by the media syndication engine as a function of reported historical usage for the customization file or similar customization files.

* * * * *